United States Patent
Zhang et al.

(10) Patent No.: US 8,452,331 B2
(45) Date of Patent: May 28, 2013

(54) METHOD AND SYSTEM FOR IMPLEMENTING MOBILE SWITCH CENTER DUAL HOMING

(75) Inventors: Hao Zhang, Shenzhen (CN); Yongli Jia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 901 days.

(21) Appl. No.: 11/962,787

(22) Filed: Dec. 21, 2007

(65) Prior Publication Data

US 2008/0096547 A1     Apr. 24, 2008

Related U.S. Application Data

(63) Continuation of application No. PCT/CN2006/001215, filed on Jun. 5, 2006.

(30) Foreign Application Priority Data

Jun. 27, 2005  (CN) .......................... 2005 1 0079993

(51) Int. Cl.
*H04W 24/00*  (2009.01)

(52) U.S. Cl.
USPC .......................................... 455/560; 455/424

(58) Field of Classification Search
USPC .................. 455/424–433, 507, 560; 370/216, 370/328–338, 259; 709/221–230
See application file for complete search history.

(56) References Cited

U.S. PATENT DOCUMENTS

| | | | |
|---|---|---|---|
| 5,691,973 A | 11/1997 | Ramstrom et al. | |
| 5,761,500 A * | 6/1998 | Gallant et al. | 707/999.01 |
| 6,408,182 B1 | 6/2002 | Davidson et al. | |
| 6,662,308 B1 | 12/2003 | Baroni et al. | |
| 7,308,491 B2 * | 12/2007 | Gosewehr | 709/221 |
| 7,463,610 B2 * | 12/2008 | Collins | 370/338 |
| 2002/0120763 A1 * | 8/2002 | Miloushev et al. | 709/230 |
| 2003/0176163 A1 * | 9/2003 | Gosewehr | 455/3.04 |
| 2003/0176165 A1 * | 9/2003 | Gosewehr | 455/9 |
| 2005/0036443 A1 * | 2/2005 | Collins | 370/216 |
| 2007/0117561 A1 | 5/2007 | Shu | |

FOREIGN PATENT DOCUMENTS

CN   1434574 A   8/2003

(Continued)

OTHER PUBLICATIONS

Vokkarane et al., "Dynamic Dual-Homing Protection in WDM Mesh Networks," *IEEE Communications Society*, 3(20): 1644-1648 (2004).

(Continued)

*Primary Examiner* — Kashif Siddiqui
(74) *Attorney, Agent, or Firm* — Leydig, Voit & Mayer, Ltd.

(57) ABSTRACT

A method for implementing Mobile Switch Center (MSC) dual homing includes: dividing a first physical MSC Server into a plurality of virtual MSC Servers; establishing a dual homing relation between a first virtual MSC Server of the plurality of virtual MSC Servers and a second physical MSC Server; switching by the first virtual MSC Server from idle state to activate state if determining by the first virtual MSC Server that state switching is needed The scheme may implement the Mobile Switch Center (MSC) dual homing, and improve the reliability of mobile communication network; the implementation is simple and flexible.

16 Claims, 8 Drawing Sheets

FOREIGN PATENT DOCUMENTS

| | | |
|---|---|---|
| CN | 1545345 A | 11/2004 |
| CN | 1327728 C | 7/2007 |
| CN | 100488299 C | 5/2009 |
| CN | 1536819 B | 8/2010 |
| EP | 1 775 970 A1 | 4/2007 |
| WO | WO 2005/039210 A1 | 4/2005 |

OTHER PUBLICATIONS

Statement of Responses for Invalidation Declaration Procedure in corresponding Chinese Patent Application No. 200510079993.7 (May 24, 2012).

International Search Report in corresponding International Patent Application No. PCT/CN2006/001215 (Sep. 14, 2006).

1st Office Action in corresponding Chinese Application No. 200510079993.7 (Jan. 19, 2007).

Written Opinion of the International Searching Authority in corresponding PCT Application No. PCT/CN2006/001215 (Sep. 14, 2006).

"3GPP TS 23.236—3rd Generation Partnership Project; Technical Specification Group Services and System Aspects; Intra-domain connection of Radio Access Network (RAN) nodes to multiple Core Network (CN) nodes (Release 5)," Mar. 2002, Version 5.2.0, $3^{rd}$ Generation Partnership Project, Valbonne, France.

"3GPP TS 23.236—3rd Generation Partnership Project; Technical Specification Group Services and System Aspects; Intra-domain connection of Radio Access Network (RAN) nodes to multiple Core Network (CN) nodes (Release 6)," Dec. 2005, Version 6.2.0, $3^{rd}$ Generation Partnership Project, Valbonne, France.

Request for Invalidation of Patent Right in corresponding Chinese Patent Application No. 200510079993.7 (Jul. 2006).

* cited by examiner

METHOD AND SYSTEM FOR IMPLEMENTING MOBILE SWITCH CENTER DUAL HOMING

CROSS-REFERENCE TO RELATED APPLICATIONS

This application is a continuation of International Patent Application No. PCT/CN2006/001215, filed Jun. 5, 2006, which claims priority to Chinese Patent Application No. 200510079993.7, filed Jun. 27, 2005, both of which are hereby incorporated by reference.

FIELD OF THE INVENTION

The present invention relates to dual homing technologies, and more particularly, to a method and system for implementing Mobile Switch Center (MSC) dual homing.

BACKGROUND OF THE INVENTION

In a second Generation (2G) or third Generation (3G) mobile communication system, MSC is an important node of core network for controlling the mobility management and various call services in the circuit domain. The steady operation of MSC device reflects the reliability of the whole mobile network. Along with the rapid development of mobile communication network, the capacity of MSC keeps rising. Especially under the 3G R4 architecture, the MSC is divided into an MSC Server and a Media Gateway (MGW). One MSC Server may manage multiple MGWs. The range controlled and the user capacity supported by each MSC Server greatly exceed those supported by the MSC of 2G system. Therefore, the reliability and the disaster recovery requirement of MSC are particularly important.

There is no disaster recovery solution provided for the MSC in the existing 2G network. When an MSC fails in the network, the services within the administration range of MSC are all interrupted until the MSC is recovered. The 3rd Generation Partnership Project (3GPP) standard organization provides an Iu-Flex solution for the disaster recovery of core network side in R5 version including: improving the reliability of the whole system by the access network connecting with multiple core network entities such as MSC and Service GPRS Supporting node (SGSN).

Figure 1:
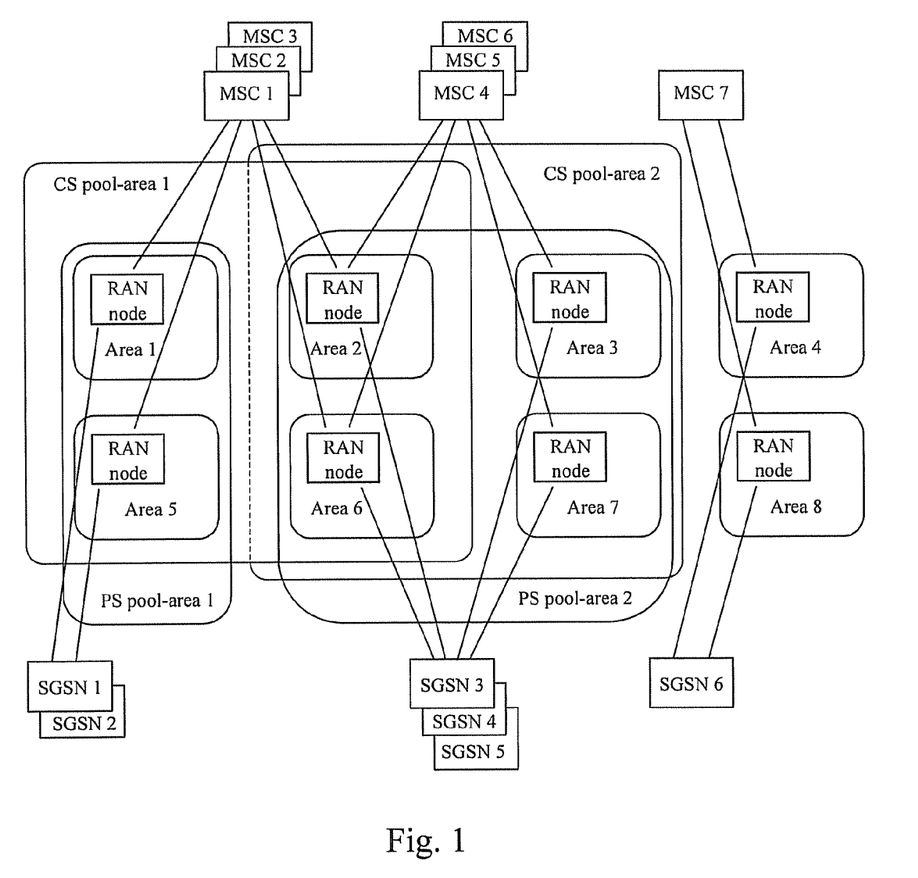
FIG. 1 is a schematic diagram of Iu-Flex networking.

With reference to FIG. 1, 3GPP standard TS23.236 proposes a concept of pool area, i.e. forming the areas covered by several Radio Access Network (RAN) nodes such as Radio Network Controllers (RNC) or Base Station Controllers (BSC) into a pool area. Services of the pool area are generally provided by several core network nodes such as MSC or SGSN in parallel. For example, as shown in FIG. 1, MSC 1, MSC 2 and MSC 3 simultaneously manage pool area 1 formed by Area 1, Area 2, Area 5 and Area 6; MSC 4, MSC 5 and MSC 6 simultaneously manage pool area 2 formed by Area 2, Area 3, Area 6 and Area 7. To identify a core network node, each core network node is allocated with one or several Network Resource Identity (NRI). When a mobile terminal establishes a Non Access Stratum (NAS) connection with a core network node, a RAN node routes the initial NAS message to the core network node corresponding to the NRI according to the NRI carried by the initial NAS message. By taking pool area 1 as an example, each of the RANs within the pool area connects with MSC 1, MSC 2 and MSC 3 simultaneously; if any of them fails, the access network cancels the route of the failed MSC, and distributes the newly initiated traffic to other MSCs. Therefore, the disaster recovery is implemented.

However, the disaster recovery solution as shown in FIG. 1 has the following problems in practical applications.

Implementation is complex. The solution as shown in FIG. 1 is a full-network solution in which the core network entity such as MSC and SGSN and the access network entity such as RNC and BSC need to be modified; especially at the MSC side, it has great impact on the location update and handover procedure due to the introduced new concept of NRI and pool area; it is needed to not only take the service condition under the Iu-Flex node within the pool area into consideration, but also to take the interaction and compatibility between pool areas and non-Iu-Flex nodes into consideration, which greatly increase the complexity of core network side service logic.

The implementation is difficult in a 2G network such as GSM. The Iu-Flex technology is introduced in 3GPP R5, and can not be supported by the BSC device of 2G network; if the BSC device of 2G network supports the Iu-Flex technology, it is needed to perform a great deal of upgrade operation, which is difficult for the development in the GSM network.

The network topology is complex. In the Iu-Flex solution, an access network entity establishes connections with multiple core network entities, which increases the complexity of network topology and is difficult for operation maintenance.

Figure 2:
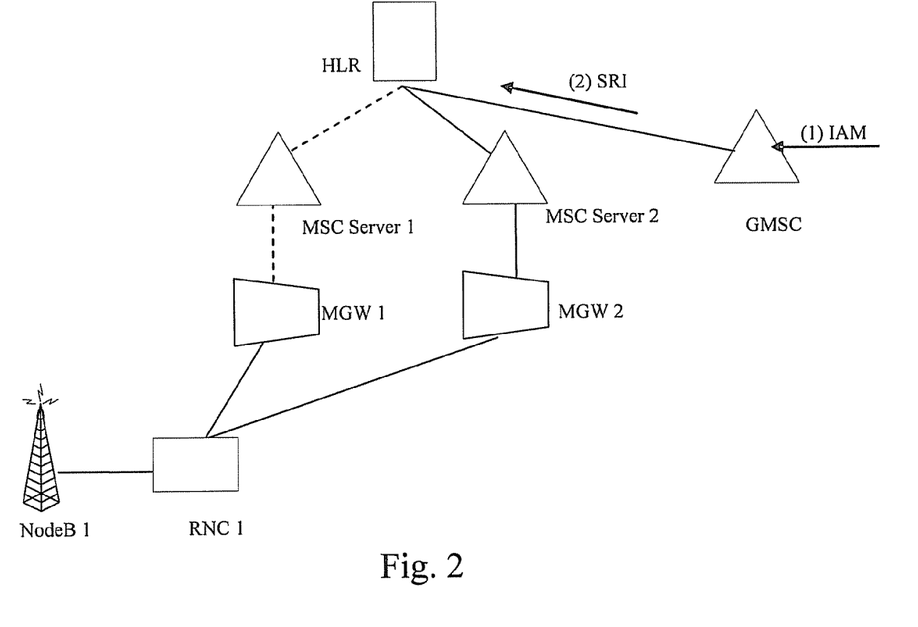
FIG. 2 is a schematic diagram of network structure under the Iu-Flex networking when MSC Server 1 fails.

There is a defect in the called service after the MSC Server fails. With reference to FIG. 2, under the Iu-Flex networking as shown in FIG. 2, after MSC Server 1 fails, if a user who originally registered under the Visitor Location Register (VLR) corresponding to MSC Server 1 does not initiate the location update procedure or the calling service procedure, this user can not be successfully called because the VLR address of this user recorded in the Home Location Register (HLR) is the VLR address of MSC Server 1.

The MGW resource is unavailable when the MSC Server fails. With reference to FIG. 2, when MSC Server 1 fails, the user plane resource of all MGWs administrated by MSC Server 1 is in idle state and can not be used. This problem is more outstanding when the range administrated by the MSC Server is large, because various voice processing resources for TC, EC and MPTY bridge provided by the MGW are all valuable; resource sharing and effective load sharing are difficult to be achieved when the networking architecture is as shown in FIG. 2.

SUMMARY OF THE INVENTION

The present invention provides a method and system for implementing the Mobile Switch Center (MSC) dual homing, to implement the Mobile Switch Center (MSC) dual homing and improve the security reliability of mobile communication network, and the implementation is simple and flexible.

A method for implementing Mobile Switch Center (MSC) dual homing, includes: dividing a first physical MSC Server into a plurality of virtual MSC Servers; establishing a dual homing relation between a first virtual MSC Server of the plurality of virtual MSC Servers and a second physical MSC Server; and switching by the first virtual MSC Server from idle state to activate state if determining by the first virtual MSC Server that state switching is needed.

Optionally, the first physical MSC Server manages at least a first network entity.

The first network entity is managed and controlled by a second virtual MSC Server of the plurality of virtual MSC Servers, and the state of the second virtual MSC Server is active.

Optionally, determining by the first virtual MSC Server that state switching is needed includes: detecting, by the first virtual MSC Server, a heartbeat connection between the first physical MSC Server and the second physical MSC Server, determining that state switching is needed if determining that a heartbeat is lost or the state of physical MSC Server in the heartbeat connection is failure.

Optionally, determining by the first virtual MSC Server that state switching is needed includes: determining that state switching is needed if a switch instruction or update state instruction is received by the first virtual MSC Server.

The second physical MSC Server manages at least a second network entity, the method further includes: establishing a signaling transport link between the first virtual MSC Server and the second network entity after the switching.

The method further includes: backuping, by the physical MSC Server, user data to a Visitor Location Register (VLR) corresponding to the first virtual MSC Server in real time if the user data is changed.

A physical MSC Server, including a plurality of virtual MSC Servers; wherein a first virtual MSC Server of the plurality of virtual MSC Servers establishes a duel homing relation with another physical MSC Server, and the first virtual MSC Server switches the state of the first virtual MSC Server from idle to active if determining that state switching is needed.

The physical MSC Server manages at least one network entity; and the at least one network entity is managed and controlled by a second virtual MSC Server of the plurality of virtual MSC Servers; wherein the second virtual MSC Server is in active state.

A system for implementing MSC dual homing, includes at least a first physical MSC Server and a second physical MSC Server, in which the first physical MSC Server communicates with the second physical MSC Server via a heartbeat connection; the first physical MSC Server is divided into a plurality of virtual MSC Servers; a first virtual MSC Server of the plurality of virtual MSC Servers of the first physical MSC Server establishes a duel homing relation with the second physical MSC Server, and the first virtual MSC Server switches from idle state to active state in response to determining that state switching is needed.

The first physical MSC Server manages at least a first network entity; and the at least a first network entity is managed and controlled by a second virtual MSC Server of the plurality of virtual MSC Servers of the first physical MSC Server.

The second physical MSC Server is divided into a plurality of virtual MSC Servers, a third virtual MSC Server of the plurality of virtual MSC Servers of the second physical MSC Server establishes a duel homing relation with the first physical MSC Server, and the third virtual MSC Server switches from idle state to active state in response to determining by heartbeat detection that state switching is needed.

Optionally, the signaling connection is established between the third virtual MSC Server and the first network entity of the first physical MSC Server after the third virtual MSC Server switches from idle state to active state.

The second physical MSC Server manages at least a second network entity; and the second network entity is managed and controlled by a fourth virtual MSC Server of the plurality of virtual MSC Servers of the second physical MSC Server.

Optionally, a first signaling connection is established between the first virtual MSC Server and the second network entity of the second physical MSC Server after the first virtual MSC Server switches from idle state to active state.

The system further includes: a VLR corresponding to the first virtual MSC Server, user data is backuped to the VLR by the second physical MSC Server in real time in response to the change of the user data.

The method provided by the present invention for implementing the Mobile Switch Center (MSC) dual homing has the following advantages and characteristics.

The dual homing relations established between MSCs greatly improve the reliability of mobile communication network, and provide a solution for restoring from the unavoidable disaster caused by nature or human.

The physical MSC Server is divided into several virtual MSC Servers, and the existing physical entity of network is used. Therefore, no new concept and entity are introduced; and compatibility problem between the existing entity and the newly introduced entity does not exist; the implementation is simple and convenient; the network topology is simple, which is favorable for operation maintenance.

A physical MSC Server is divided into several virtual MSC Servers, and each of the virtual MSC Servers has independent processing subsystems; therefore, by establishing the dual homing relation between different virtual MSC Servers and multiple MSC Server physical entities, the core network node resource is saved and it can apply to various network such as 2G network or 3G network, the effect is similar to the dual homing with an MSC Server physical entity in practical applications.

Because a small number of physical entities are used in practice, it is possible to lead to the least impact for existing network services and the highest utilization for existing network resource during the switching process caused by a failure.

In the present invention, the makeup of each virtual MSC Server and the function and effect provided thereby are completely identical to an MSC Server physical entity; therefore, the service logic such as call and switching keeps unchanged and there is no additional impact for the charging and statistic after the dual homing switching; there is no special requirement for network element except MSC Server and there is no impact for external network element during the switching.

The dual homing switching of the present invention may be applied to the version upgrade with large variance, so as to reduce the impact made by the upgrade for the existing network services as much as possible.

DETAILED DESCRIPTION OF THE INVENTION

Figure 3:
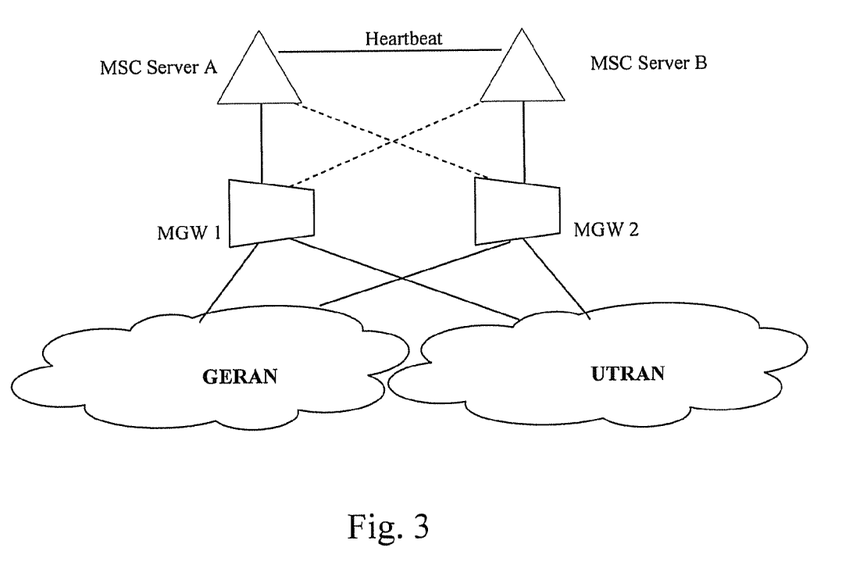
FIG. 3 is a networking schematic diagram for the MSC implementing the dual homing.

Taking the device integrity, cost, disaster recovery capability and network security into consideration uniformly, dual homing is introduced into the mobile communication system to avoid core network failure, provide emergence communication during burst disaster emergency, and provide fast recovery capability for device communication during an extremely abnormal condition. Such dual homing in actual is a special connection mode. As shown in FIG. 3, MGW 1 and MGW 2 both establish connections with MSC Server A and MSC Server B. Corresponding data of MGW 1 and MGW 2 are configured in both MSC Server A and MSC Server B. MSC Server A performs state maintenance and negotiation with MSC Server B through a heartbeat connection. In normal condition, MSC Server A is the home MSC Server of MGW 1, and only provides services for MGW 1; MSC Server B is the home MSC Server of MGW 2, and only provides services for MGW 2. When an MSC Server such as MSC Server B fails, MSC Server A takes over MGW 2 and provides services for MGW 2 until MSC Server B is recovered. The state maintenance and negotiation through the heartbeat connection is generally performed by sending a heartbeat message or handshake message between two physical entities to exchange states with each other. Therefore, the detection of the heartbeat message or the information carried by the heartbeat message is referred to as heartbeat detection.

For the purpose of effectively saving the resource of core network node during dual homing, according to the present invention, any MSC Server physical entity which is referred to as physical MSC Server as follows is divided into more than one virtual MSC Servers, and one of the virtual MSC Servers is used for managing and controlling all subordinate network nodes of the physical MSC Server to which the virtual MSC Servers belong; the subordinate network node may be all MGWs managed by the physical MSC Server to which the virtual MSC Servers belong; if there is no network node of the physical MSC Server to which the virtual MSC Servers belongs needing to be managed, the virtual MSC Server may not be set; the rest virtual MSC Servers can establish dual homing relations with different physical MSC Servers; all data of the corresponding physical MSC Server are configured respectively in each virtual MSC Server, for example, all MGW data administrated by the physical MSC Server and other network element entity data such as HLR, VLR and SMC are configured.

Figure 4:
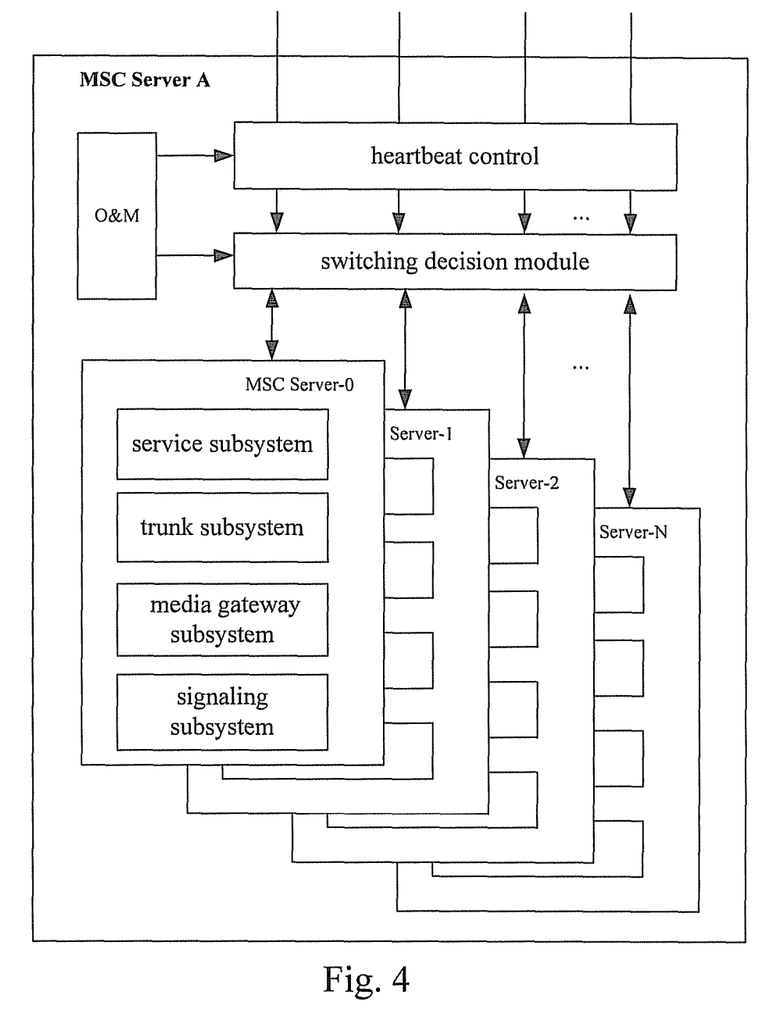
FIG. 4 is a schematic diagram for dividing an MSC Server physical entity into multiple virtual MSC Servers.

With reference to FIG. 4, MSC Server A is a physical MSC Server which can be divided into more than one virtual MSC Servers in terms of function. For example, MSC Server A is divided into MSC Server-0, MSC Server-1, MSC Server-2 . . . and MSC Server-N according to different application, and MSC Server-0 is used for managing and controlling all subordinate MGWs of MSC Server A and provides services for all subordinate MGWs of MSC Server A; the rest MSC Server-1, MSC Server-2 . . . and MSC Server-N may respectively establish dual homing relations with the rest N physical MSC Servers such as MSC Server B and MSC Server C; correspondingly, all MGW data administrated by N physical MSC Servers such as MSC Server B and MSC Server C and data of other related network element entity such as HLR, VLR and SMC are respectively configured in MSC Server-1, MSC Server-2 . . . and MSC Server-N. Therefore, corresponding virtual MSC Server can provide services for all MGWs administrated by the physical MSC Server having the dual homing relation with the virtual MSC Server when the physical MSC Server fails.

Each virtual MSC Server is independent of other MSC Servers and has independent processing mechanism such as a signaling subsystem, a media gateway subsystem, a trunk subsystem and a service subsystem. All virtual MSC Servers share the switching decision mechanism, heartbeat control mechanism and Operations & Maintenance (O&M) mechanism.

Each virtual MSC Server has its own management state such as ACTIVE and IDLE. When a virtual MSC Server is in active state, the signaling network data and the gateway control data of the virtual MSC Server are active, so that the trunk data and service data are active; the virtual MSC Server is in normal working state and provides corresponding service. However, if a virtual MSC Server is in idle state, the signaling, gateway, trunk and service data of the virtual MSC Server are in inactive state, and the virtual MSC Server is unable to provide services.

The state of each virtual MSC Server is maintained through the heartbeat connection with the physical MSC Server having the dual homing relation with the virtual MSC Server. In normal condition, the virtual MSC Server providing services for the MGWs managed by the virtual MSC Server is in the active state, and the other virtual MSC Servers of physical MSC Server are all in the idle state. When a virtual MSC Server detects the heartbeat is lost or the state of MSC Server in the heartbeat connection is failure, the virtual MSC Servers switches its management state from idle to active under the decision of switching decision module.

The dual homing switching includes automatic switching. Specifically, the virtual MSC Server detects that the physical MSC Server having the dual homing relation with the virtual MSC Server fails, automatically switches its management state under the decision of switching decision module, and sets its state as active. In practical applications, there is also a passive switching manner which may be referred to as manual switching. Specifically, a switching decision module of a physical MSC Server receives a switching command via the O&M, sends a switching instruction or state changing instruction to a virtual MSC Server. The virtual MSC Server is indicated in the switching command received by the switching decision module from the O&M. The virtual MSC Server receives the switching instruction or state changing instruction sent by the switching decision module, sets the state of the virtual MSC Server as active. The passive switching may be performed at any time as long as the O&M sends a switching instruction to the switching decision module.

Each physical MSC Server can be divided into more than one virtual MSC Servers. Therefore, there are various flexible networking modes on the basis of virtual MSC Servers; as shown in FIGS. 5-9, the access network entity is not considered. Various dual homing networking modes may be categorized into a standby networking mode and a sharing networking mode. For the standby networking mode, a physical MSC Server does not have a managed MGW, and completely serves as the standby of another physical MSC Server. For the sharing networking mode, two physical MSC Servers respectively manage and control one or more MGWs, each of the two physical MSC Servers is a standby of the other. For both the standby networking mode and the sharing networking mode, the state maintenance and negotiation are performed between the physical MSC Servers with the dual homing relation through the heartbeat connection. In FIGS. 5-9, all heartbeat connections are represented by dot-and-dash lines. In FIGS. 5-9, a bold real line represents the connection between an MGW and the home physical MSC Server; a normal real line represents the connection between an MGW and the standby or sharing physical MSC Server. The networking modes on the basis of the virtual MSC Server are described in details as follows with reference to the accompanying drawings.

Figure 5:
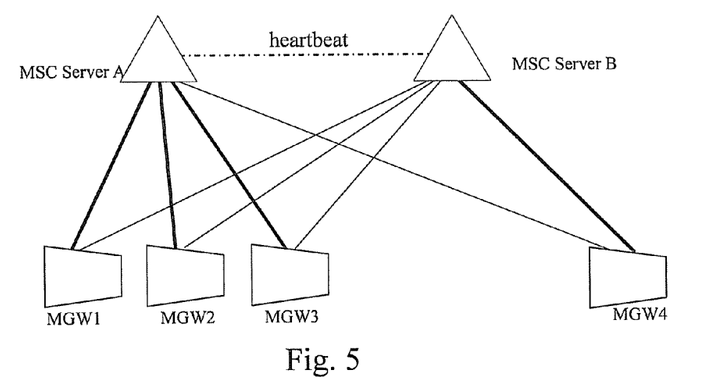
FIG. 5 is a schematic diagram illustrating the 1+1 sharing networking mode on the basis of the virtual MSC Server.
Figure 10:
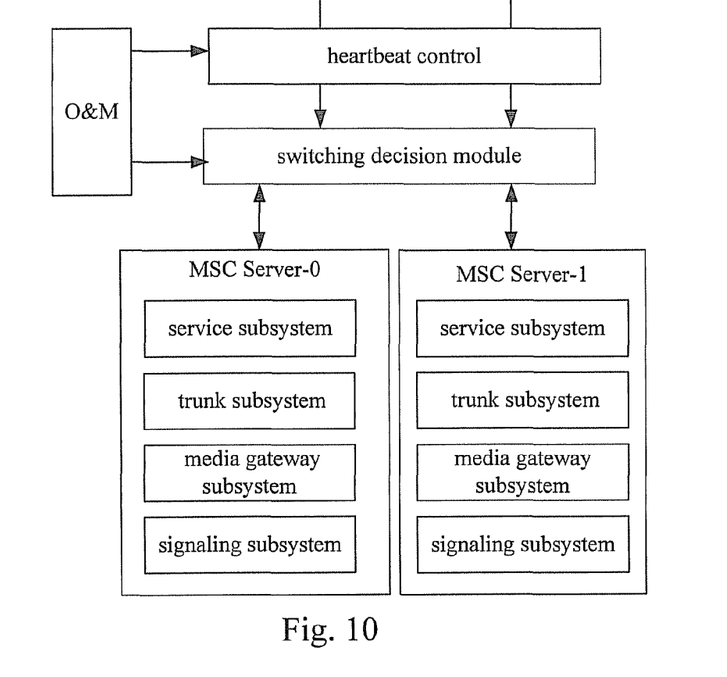
FIG. 10 is a schematic diagram for dividing an MSC Server physical entity into two virtual MSC Servers.

FIG. 5 illustrates a 1+1 sharing networking mode on the basis of virtual MSC Servers. With reference to FIG. 5, MSC Server A and MSC Server B are two physical MSC Servers which are respectively divided into two virtual MSC Servers: MSC Server-0 and MSC Server-1 as shown in FIG. 10. MSC Server-0 of MSC Server A provides services for MGW1, MGW2 and MGW3. MSC Server-1 establishes dual homing relation with MSC Server B. MSC Server-0 of MSC Server B provides services for MGW4. MSC Server-1 establishes dual homing relation with MSC Server A. Maintenance between MSC Server A and MSC Server B is performed through a heartbeat connection. The state of MSC Server-1 in MSC Server A is maintained through the heartbeat connection with MSC Server B. The state of MSC Server-1 in MSC Server B is maintained by the heartbeat connection with MSC Server A. In normal condition, MSC Server-1 in either MSC Server A or MSC Server B is in an idle state. If MSC Server-1 in either MSC Server A or MSC Server B finds that the heartbeat is lost or the state of the other physical MSC Server in the heartbeat connection is failure, the state of MSC Server-1 in either MSC Server A or MSC Server B is switched from idle to active.

Figure 6:
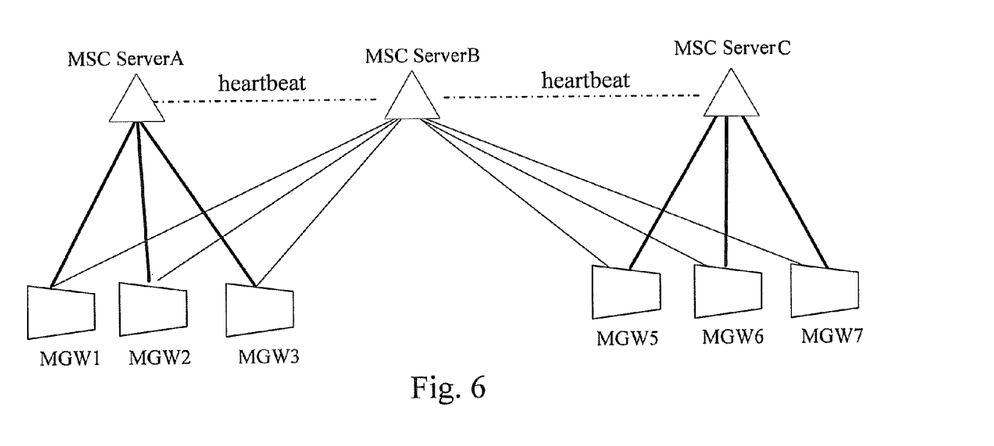
FIG. 6 is a schematic diagram illustrating the N+1 standby networking mode on the basis of the virtual MSC Server according to an embodiment.

FIG. 6 illustrates an N+1 primary-standby networking mode on the basis of the virtual MSC Server according to an embodiment with three physical MSC Servers as an example. With reference to FIG. 6, N equals to 2. In FIG. 6, MSC Server A, MSC Server B and MSC Server C are three physical MSC Servers. MSC Server A and MSC Server C each is divided into two virtual MSC Servers: MSC Server-0 and MSC Server-1, as shown in FIG. 10. MSC Server B may be divided into three or two virtual MSC Servers because MSC Server B does not manage an MGW. MSC Server-0 of MSC Server A provides services for MGW1, MGW2 and MGW3. MSC Server-1 establishes a dual homing relation with a virtual MSC Server of MSC Server B. MSC Server-0 of MSC Server C provides services for MGW5, MGW6 and MGW7. MSC Server-1 establishes a dual homing relation with another virtual MSC Server of MSC Server B. Maintenance among MSC Server A, MSC Server C and MSC Server B is performed through heartbeat connections. If MSC Server B is divided into two virtual MSC Servers, in normal condition, two virtual MSC Servers of MSC Server B are in idle state; if a heartbeat is lost or the state of physical MSC Server in the heartbeat connection is failure, for example MSC Server A fails, the state of the virtual MSC Server establishing the dual homing relation with MSC Server A is switched from idle to active and the virtual MSC Server provides services for MGW1, MGW2 and MGW3.

Figure 7:
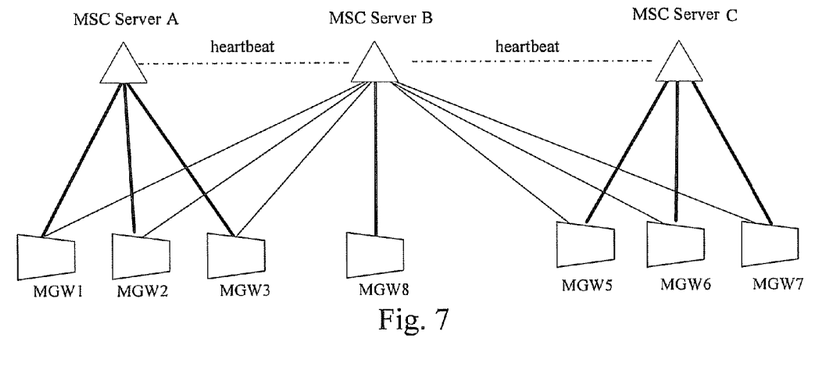
FIG. 7 is a schematic diagram illustrating the N+1 sharing networking mode on the basis of the virtual MSC Server according to an embodiment.

FIG. 7 illustrates an N+1 sharing networking mode on the basis of virtual MSC Servers according to an embodiment with three physical MSC Servers as an example. With reference to FIG. 7, N equals to 2. In FIG. 7, MSC Server A, MSC Server B and MSC Server C are three physical MSC Servers. MSC Server A and MSC Server C each is divided into two virtual MSC Servers: MSC Server-0 and MSC Server-1, as shown in FIG. 10. MSC Server B may be divided into three virtual MSC Servers, wherein one is used for providing services for MGW8 and another two virtual MSC Servers establish dual homing relations with MSC Server A and MSC Server C respectively. MSC Server-0 of MSC Server A provides services for MGW1, MGW2 and MGW3. MSC Server-1 establishes a dual homing relation with MSC Server B. MSC Server-0 of MSC Server C provides services for MGW5, MGW6 and MGW7. MSC Server-1 establishes a dual homing relation with another virtual MSC Server of MSC Server B. Maintenance among MSC Server A, MSC Server C and MSC Server B is performed through the heartbeat connections respectively. In normal condition, two virtual MSC Servers of MSC Server B establishing the dual homing relation with MSC Server A and MSC Server C are in idle state. If a heartbeat is lost or the state of physical MSC Server in the heartbeat connection is failure, for example MSC Server A fails, the state of the virtual MSC Server establishing the dual homing relation with MSC Server A is switched from idle to active and the virtual MSC Server provides services for MGW1, MGW2 and MGW3. Likewise, for MSC Server A or MSC Server C, MSC Server A is taken as an example; in normal condition, MSC Server-1 of MSC Server A is in an idle state; if a heartbeat is lost or the state of MSC Server B in the heartbeat connection is failure, the state of MSC Server-1 of MSC Server A is switched from idle to active and MSC Server-1 provides services for MGW8. If MSC Server-1 of MSC Server A and MSC Server C both detect that MSC Server B fails, whether MSC Server-1 of MSC Server A or MSC Server-1 of MSC Server C provides services for MGW8 is determined according to a rule, for example the service is provided by the MSC Server that first detects the failure or according to the current load condition.

Figure 8:
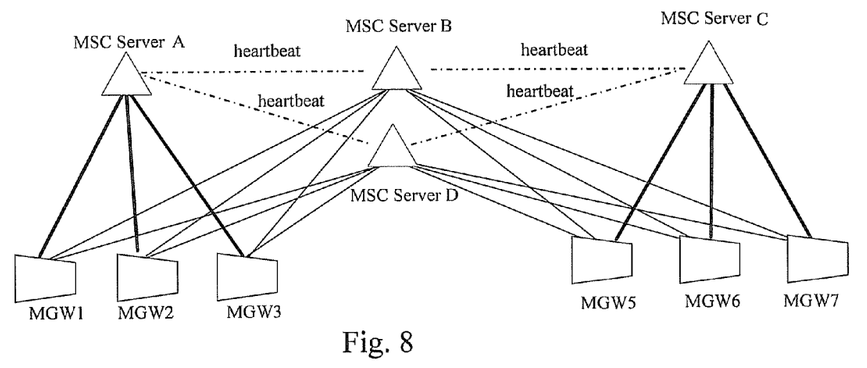
FIG. 8 is a schematic diagram illustrating the N+M standby networking mode on the basis of the virtual MSC Server according to an embodiment.
Figure 9:
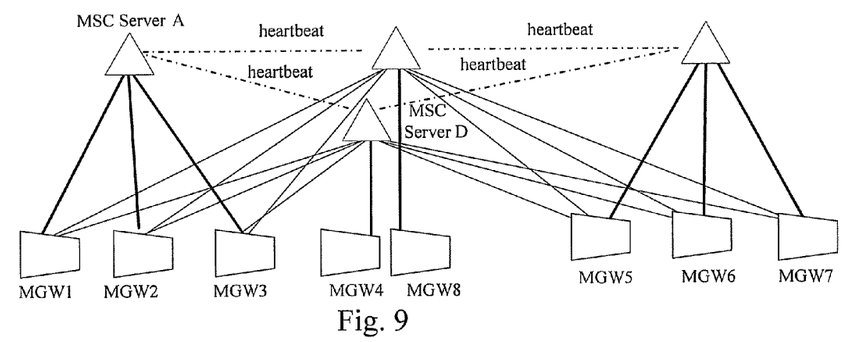
FIG. 9 is a schematic diagram illustrating the N+M sharing networking mode on the basis of the virtual MSC Server according to an embodiment.

FIGS. 8 and 9 respectively illustrate an N+M primary-standby networking mode and a sharing networking mode on the basis of the virtual MSC Server with four physical MSC Servers as an example. With reference to FIGS. 8 and 9, N equals to 2 and M equals to 2. In FIGS. 8 and 9, MSC Server A, MSC Server B, MSC Server C and MSC Server D are four physical MSC Servers. In FIG. 8, MSC Server A and MSC Server C each is divided into three virtual MSC Servers. One virtual MSC Server of MSC Server A provides services for MGW1, MGW2 and MGW3, the other two virtual MSC Servers establish dual homing relations with MSC Server B and MSC Server D respectively. The division of MSC Server C is similar to that of MSC Server A. MSC Server B and MSC Server D may be divided into three or two virtual MSC Servers because they do not manage MGW. The division of MSC Server A and MSC Server C in FIG. 9 is similar to that in FIG. 8. MSC Server B and MSC Server D are respectively divided into three virtual MSC Servers. One virtual MSC Server provides services for its managed MGW such as MGW4 or MGW8, and the other two virtual MSC Servers establish dual homing relations with MSC Server A and MSC Server C respectively. The working principles of MSC Server A and MSC Server C in FIG. 8 are similar to the working principles in FIG. 6. The working principles of MSC Server B and MSC Server D in FIG. 8 are similar to the working principles of MSC Server B in FIG. 6. The working principles of MSC Server A and MSC Server C in FIG. 9 are similar to those in FIG. 7. The working principles of MSC Server B and MSC Server D in FIG. 9 are similar to the working principles of MSC Server B in FIG. 7. If MSC Server B or MSC Server D fails, the rule for determining whether the service is provided by the virtual MSC Server of MSC Server A or MSC Server C is similar to that in FIG. 7.

In the networking modes as illustrated in FIGS. 6-9, any two physical MSC Servers with a heartbeat connection have the dual homing relation to each other, the N+1 or N+M home relation is formed among all physical MSC Servers.

In the above various networking modes, signaling subsystem dual homing is the basis for implementing the MSC Server dual homing. The signaling subsystem dual homing includes that, a physical MSC Server uses the IP bearer broadband signaling between the MGW/SG and the physical MSC Server instead of directly providing a narrowband signaling interface. Therefore, any physical connection of signaling transport (SIGTRAN) link of other network elements arriving at a physical MSC Server can be configured onto the MGW/SG, and the MGW/SG can be flexibly switched between the MSC Servers having the dual homing relation via the SIGTRAN link with the physical MSC Server.

Figure 11:
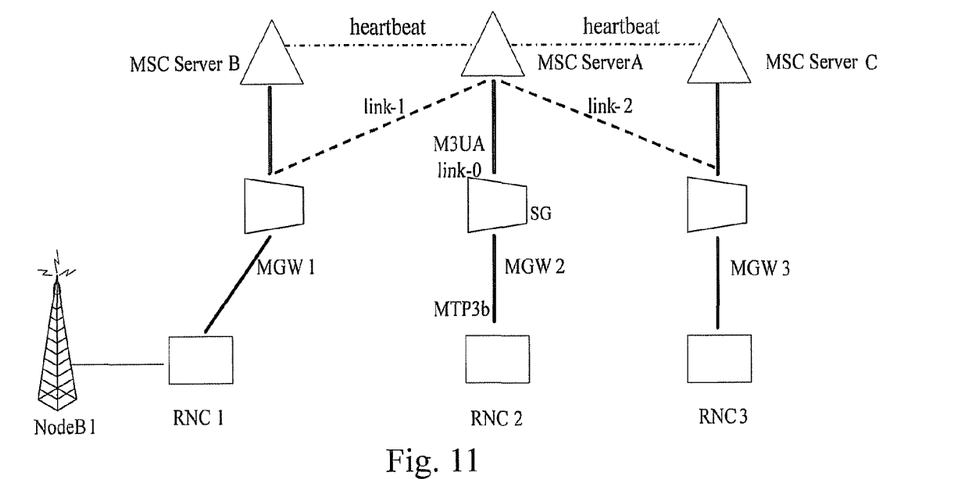
FIG. 11 is a networking schematic diagram for the dual homing of Iu interface.

With reference to FIG. 11, MSC Server A, MSC Server B and MSC Server C are three physical MSC Servers. MSC Server A is the sharing MSC Server of MSC Server B and MSC Server C. Specifically, according to the dual homing spirit of the present invention, MSC Server A is divided into three virtual MSC Servers such as MSC Server-0, MSC Server-1 and MSC Server-2. MSC Server-0 is used for managing and controlling MGW2. MSC Server-1 and MSC Server-2 establish the dual homing sharing relation with MSC Server B and MSC Server C respectively. In FIG. 11, each physical MSC Server has a M3UA link with its managed MGW. For example, M3UA links are configured between MSC Server A and MGW2, between MSC Server B and MGW1, and between MSC Server C and MGW3. Each MGW has an MTP3b link with its managed RNC and serves as a signaling gateway (SG) for forwarding signaling transport link. The bold real line represents the primary link in FIG. 11. In signaling subsystems of MSC Server-1 and MSC Server-2, M3UA links are configured to MGW1 and MGW3, but M3UA links are not established before the dual homing switching, as the dashed line shown in FIG. 11, when the dual homing switching is performed, i.e. the state of MSC Server-1 or MSC Server-2 is changed as active, MSC Server-1 or MSC Server-2 of MSC Server A initiates a procedure for establishing the corresponding M3UA link to MGW1 or MGW3.

Figure 12:
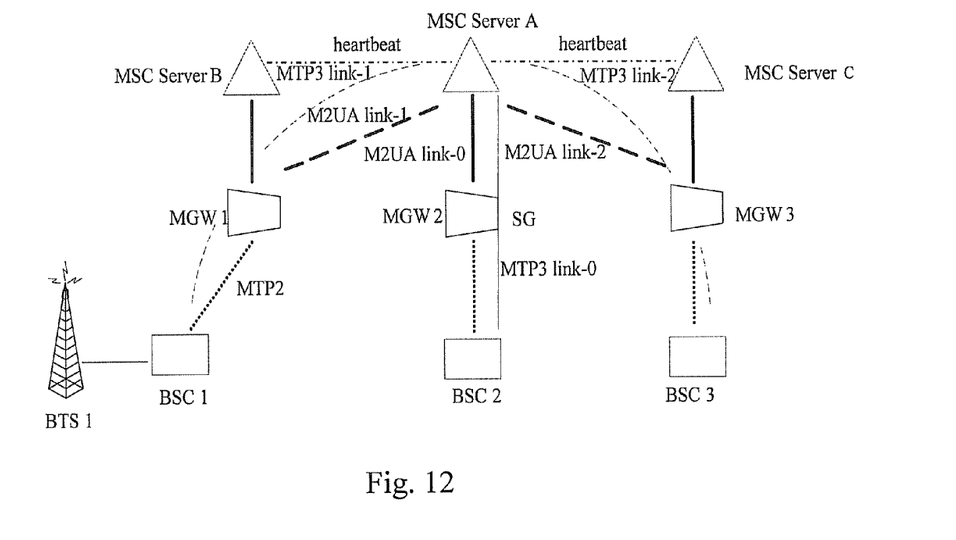
FIG. 12 is a networking schematic diagram for the dual homing of A interface.

With reference to FIG. 12, MSC Server A, MSC Server B and MSC Server C are three physical MSC Servers. MSC Server A is the sharing MSC Server of MSC Server B and MSC Server C. Specifically, according to the dual homing spirit of the present invention, MSC Server A is divided into three virtual MSC Servers such as MSC Server-0, MSC Server-1 and MSC Server-2. MSC Server-0 is used for managing and controlling MGW2. MSC Server-1 and MSC Server-2 establish dual homing sharing relations with MSC Server B and MSC Server C respectively. An M2UA link, identified by the bold real line, is configured between each physical MSC Server supporting A interface dual homing and the MGW for carrying the MTP3 signaling. The narrowband MTP2, identified by the dotted line, is configured between the MGW and the BSC to carry MTP3 signaling. The MGW serves as the SG forwarding and does not need to configure a signaling point. Before the dual homing switching, the M2UA identified by the dashed line and the MTP3 link in FIG. 12 are not established in the MSC Server A. When the dual homing switching occurs, for example MSC Server B fails, virtual MSC Server-1 of MSC Server A will establish the M2UA link to MGW1, such as M2UA link-1 shown in FIG. 12, and establish the MTP3 link to BSC1, such as MTP3 link-1 shown in FIG. 12.

The modes described in FIGS. 11 and 12 are applicable to the case when a physical MSC Server communicates with other network elements such as an HLR, SCP and SMC through the narrowband signaling. When an external network element such as an HLR and SCP supports SIGTRAN, the physical MSC Server may also connect with such entities directly by the use of the broadband signaling.

For the solution implementing the MSC dual homing, it is needed to solve the problems of mobility management, call route and data backup after the switching.

Figure 13:
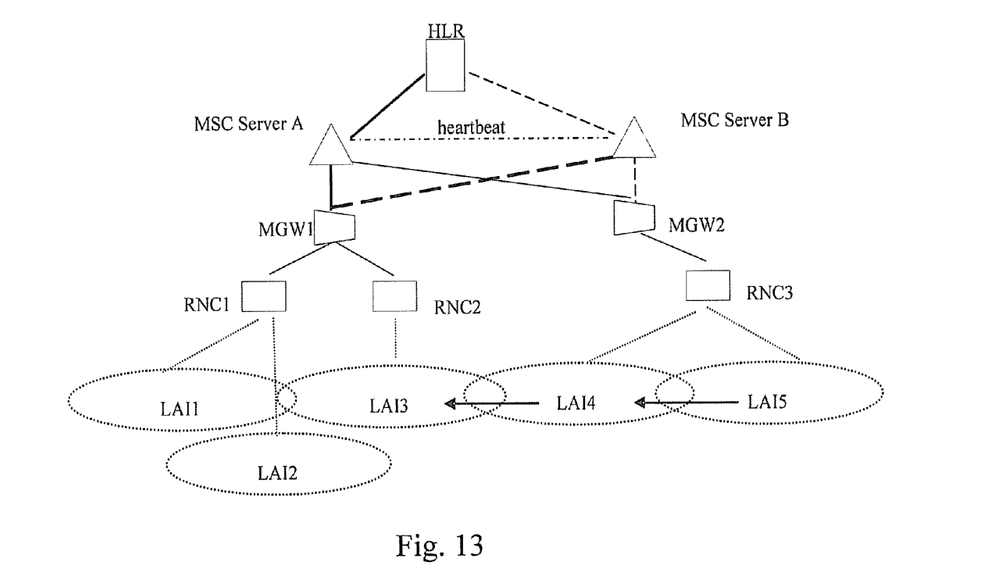
FIG. 13 is a schematic diagram for implementing the location update after the dual homing switching.

For the mobility management, each virtual MSC Server has its own mobility data, for example the RNC, BSC and LAC (Location Area Cell) belonging to a virtual MSC Server. Therefore, the location update within the virtual MSC Server and VLR will be implemented successfully once the signaling subsystems of the switched virtual MSC Server are activated. With reference to FIG. 13, MSC Server A and MSC Server B are two physical MSC Servers. MSC Servers A and B are divided into two virtual MSC Servers such as MSC Server-0 and MSC Server-1 respectively, as shown in FIG. 10. MSC Server-0s of MSC Servers A and B provide services for MGW1 and MGW2 respectively. MSC Server-1 of MSC Server A establishes a dual homing relation with MSC Server B. MSC Server-1 of MSC Server B establishes a dual homing relation with MSC Server A. The normal dashed line in FIG. 13 represents that MSC Server B fails, and the dual homing switching is performed, i.e. the state of MSC Server-1 in MSC Server A is changed from idle to active, so that MSC Server-1 of MSC Server A provides services for MGW2. In practical applications, the changing of the state makes MSC Server A provide services for MGW1 and MGW2. In this case, if a terminal performs location update from LAI5 to LAI4, the location update will be successful if MSC Server-1 is normally activated, because LAI5 and LAI4 are simultaneously administrated by MSC Server-1, and the corresponding data is within the same VLR.

When a terminal performs location update from LAI4 to LAI3, because LAI4 and LAI3 are administrated by different virtual MSC Servers, and each of the virtual MSC Servers corresponds to a virtual MSC Server VLR, the location update from LAI4 to LAI3 belongs to a location update between virtual MSC Server VLRs, and the procedure is similar to that in the prior art. In this case, however, it is possible to lead to the message competition for inserting user data and deleting user data between HLR and two virtual MSC Server VLRs, and the message competition may be eliminated by activating a corresponding timer for protection in the virtual MSC Server VLR.

In the case that the data backup is not performed in the VLR corresponding to the MSC Server having the dual homing relation, because there is no location information necessary for delivering the full-network paging when the user of the switched MSC Server is first served as a called user, the paging is only delivered within the VLR range by matching the VLR number recorded in the HLR, so as to avoid the access network overload caused by delivering the paging simultaneously in multiple virtual MSC Servers. For example, after MSC Server-1 of MSC Server A in FIG. 13 takes over MGW2, if the data backup is not performed for the VLR corresponding to MSC Server-1, it is needed to deliver the paging for users within LAI4 and LAI5 area; in this case, it is should be guaranteed to only deliver the paging in LAI4 and LAI5 area instead of LAI1~LAI3 by matching the VLR number recorded in the HLR.

For the call route, the virtual MSC Server of the present invention has its call route data, the call rout within the virtual MSC Server or the call route with other network elements keeps unchanged before or after switching. In particular, the call route between the MSC Servers switched is not changed, and the call route between the MSC Servers can be implemented by the interaction of signaling subsystems of virtual MSC Servers.

Figure 14:
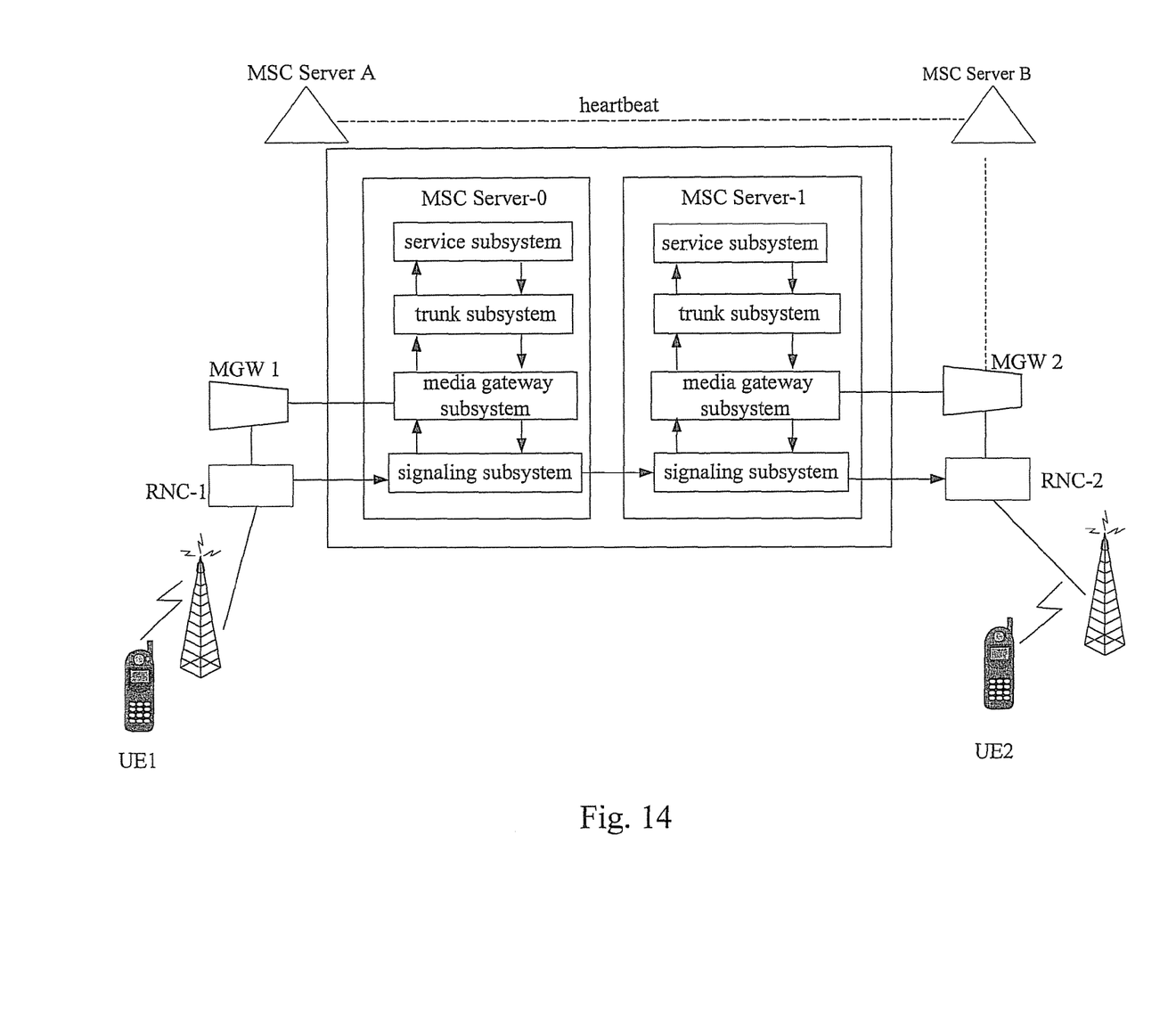
FIG. 14 is a schematic diagram for implementing a call between the virtual MSC Servers after the dual homing switching.

With reference to FIG. 14, MSC Server A and MSC Server B are two physical MSC Servers. MSC Server A is divided into two virtual MSC Servers such as MSC Server-0 and MSC Server-1. MSC Server-1 has the dual homing relation with MSC Server B. The dashed lines in FIG. 14 represent that MSC Server B fails, and the state of MSC Server-1 is changed from idle to active, i.e. the dual homing switching is performed. If UE1 accessing from RNC1 calls UE2 of RNC2, the call is handled as the outgoing call in MSC Server A and as the incoming call in MSC Server B before the dual homing switching is performed. After the dual homing switching is performed, because each virtual MSC Server has its independent processing subsystems, the call needs to pass through the interaction of signaling subsystems between virtual MSC Servers, i.e. pass through the interaction of signaling subsystem between MSC Server-0 of RNC-1 and MSC Server-1 of RNC-2. The call is still handled as an outgoing call and an incoming call respectively in two virtual MSC Servers, which is similar to the switching between virtual MSC Servers. By the above processing, the service logic such as call and switching keeps unchanged before and after the dual homing MSC Server switching is performed, which has also no additional impact for charging and statistic.

For the data backup between MSC Server VLRs, there is the data backup between the MSC Server VLRs having the sharing or standby relation, which can be solved by selecting to initiate the data backup mechanism.

If the VLR data backup is not initiated, there is no original VLR data in the new MSC Server after the dual homing switching is performed. In this case, for a calling service, if no user data is found, the call fails and the mobile phone location update is triggered. For a called service, if no user data is found after the service is routed to the new MSC Server, the data restoration procedure is triggered. Although it has no impact for the calling/called service, it has a certain impact for the HLR within a time period, and the impact depends on the user amount of the switched VLR and the time when the switching is performed.

If the VLR data backup mechanism is initiated, when the user data is changed, the physical MSC Server backups the user data to the VLR corresponding to the standby or sharing virtual MSC Server. By this way, the calling or called service are not affected and the load impact for HLR is reduced after the dual homing switching is performed.

The above description is only preferred embodiments of the present invention, but not limitative to the protection scope.

What is claimed is:

1. A method for implementing Mobile Switch Center (MSC) dual homing, comprising:
dividing a first physical MSC Server into a plurality of virtual MSC Servers, wherein the function and effect provided by each of the plurality of virtual MSC Servers are identical to the first physical MSC Server;
establishing a dual homing relation between a first virtual MSC Server of the a plurality of virtual MSC Servers and a second physical MSC Server, wherein the first physical MSC server communicates with the second physical MSC server via a heartbeat connection;
switching by the first virtual MSC Server from an idle state to an activate state if determining by the first virtual MSC Server that a state switching is needed.

2. The method of claim 1, wherein the first physical MSC Server manages at least a first network entity.

3. The method of claim 2, wherein the first network entity is managed and controlled by a second virtual MSC Server of the plurality of virtual MSC Servers, and a state of the second virtual MSC Server is active.

4. The method of claim 1, wherein determining by the first virtual MSC Server that a state switching is needed comprises:
detecting, by the first virtual MSC Server, the heartbeat connection between the first physical MSC Server and the second physical MSC Server, determining that the state switching is needed if determining that a heartbeat is lost or the state of one of the first or second physical MSC Server in the heartbeat connection is failure.

5. The method of claim 1, wherein determining by the first virtual MSC Server that a state switching is needed comprises:
determining that the state switching is needed if a switch instruction or an update state instruction is received by the first virtual MSC Server.

6. The method of claim 1, wherein the second physical MSC Server manages at least a second network entity, the method further comprises:
establishing a signaling transport link between the first virtual MSC Server and the second network entity after the switching.

7. The method of claim 1, further comprising:
backing up, by the second physical MSC Server, user data to a Visitor Location Register (VLR) corresponding to the first virtual MSC Server in real time if the user data is changed.

8. A physical Mobile Switching Center (MSC) Server, comprising a plurality of virtual MSC Servers, wherein the function and effect provided by each of the plurality of virtual MSC Servers are identical to the first physical MSC Server and a first virtual MSC Server of the plurality of virtual MSC Servers establishes a dual homing relation with a second physical MSC Server, and the first virtual MSC Server switches a state of the first virtual MSC Server from idle to active if determining that a state switching is needed.

9. The physical MSC Server of claim 8, wherein the first physical MSC Server manages at least one network entity; and the at least one network entity is managed and controlled by a second virtual MSC Server of the plurality of virtual MSC Servers; wherein the second virtual MSC Server is in an active state.

10. A system for implementing Mobile Switch Center (MSC) dual homing, comprising at least a first physical MSC Server and a second physical MSC Server, wherein the first physical MSC Server communicates with the second physical MSC Server via a heartbeat connection; the first physical MSC Server is divided into a plurality of virtual MSC Servers, wherein the function and effect provided by each of the plurality of virtual MSC Servers are identical to the first physical MSC Server; a first virtual MSC Server of the plurality of virtual MSC Servers of the first physical MSC Server establishes a dual homing relation with the second physical MSC Server, and the first virtual MSC Server switches from an idle state to an active state in response to determining that a state switching is needed.

11. The system of claim 10, wherein the first physical MSC Server manages at least a first network entity; and the first network entity is managed and controlled by a second virtual MSC Server of the plurality of virtual MSC Servers of the first physical MSC Server.

12. The system of claim 11, wherein the second physical MSC Server is divided into a plurality of virtual MSC Servers, a third virtual MSC Server of the a plurality of virtual MSC Servers of the second physical MSC Server establishes a dual homing relation with the first physical MSC Server, and the third virtual MSC Server switches from an idle state to an active state in response to determining by a heartbeat detection that state switching is needed.

13. The system of claim 12, wherein a second signaling connection is established between the third virtual MSC Server and the first network entity of the first physical MSC Server after the third virtual MSC Server switches from an idle state to an active state.

14. The system of claim 12, wherein the second physical MSC Server manages at least a second network entity; and the second network entity is managed and controlled by a fourth virtual MSC Server of the plurality of virtual MSC Servers of the second physical MSC Server.

15. The system of claim 14, wherein a first signaling connection is established between the first virtual MSC Server and the second network entity of the second physical MSC Server after the first virtual MSC Server switches from an idle state to an active state.

16. The system of claim 11, further comprising:
a Visitor Location Register (VLR) corresponding to the first virtual MSC Server, wherein user data is backed up to the VLR by the second physical MSC Server in real time in response to the change of the user data.

* * * * *

UNITED STATES PATENT AND TRADEMARK OFFICE
CERTIFICATE OF CORRECTION

PATENT NO.      : 8,452,331 B2
APPLICATION NO. : 11/962787
DATED           : May 28, 2013
INVENTOR(S)     : Zhang et al.

It is certified that error appears in the above-identified patent and that said Letters Patent is hereby corrected as shown below:

In the Claims

Column 12, line 2, Claim 1, "the a plurality" should read -- a plurality --.

Signed and Sealed this
Twenty-fifth Day of March, 2014

Michelle K. Lee
*Deputy Director of the United States Patent and Trademark Office*